(12) United States Patent
Catalano et al.

(10) Patent No.: US 11,971,221 B2
(45) Date of Patent: Apr. 30, 2024

(54) THERMAL BATTERY AND ELECTRICITY GENERATION SYSTEM

(71) Applicant: THE SUNLANDS COMPANY PTY LTD, Melbourne (AU)

(72) Inventors: Sal Catalano, Melbourne (AU); Bruno Ruggiero, Melbourne (AU)

(73) Assignee: The Sunlands Company Pty Ltd, Victoria (AU)

( * ) Notice: Subject to any disclaimer, the term of this patent is extended or adjusted under 35 U.S.C. 154(b) by 0 days.

(21) Appl. No.: 16/768,030

(22) PCT Filed: Nov. 11, 2018

(86) PCT No.: PCT/AU2018/051274
§ 371 (c)(1),
(2) Date: May 28, 2020

(87) PCT Pub. No.: WO2019/104387
PCT Pub. Date: Jun. 6, 2019

(65) Prior Publication Data
US 2020/0363138 A1 Nov. 19, 2020

(30) Foreign Application Priority Data
Nov. 29, 2017 (AU) .................. 2017904817

(51) Int. Cl.
*F28D 20/02* (2006.01)
*C09K 5/12* (2006.01)
(Continued)

(52) U.S. Cl.
CPC ............ *F28D 20/0034* (2013.01); *C09K 5/12* (2013.01); *F28D 20/0056* (2013.01);
(Continued)

(58) Field of Classification Search
CPC ... Y02E 60/14; F28D 20/0056; F28D 20/021; F28D 20/023; F28D 20/028; F28D 2020/0047
See application file for complete search history.

(56) References Cited

U.S. PATENT DOCUMENTS 4,089,176 A * 5/1978 Ashe .................. F02C 1/05
60/659
5,994,681 A * 11/1999 Lloyd .................. F03D 9/22
219/628
(Continued)

FOREIGN PATENT DOCUMENTS

WO WO-2014057014 A1 * 4/2014 ............ F24D 11/003

OTHER PUBLICATIONS

International Search Report dated Feb. 6, 2019 in PCT/AU2018/051274.

*Primary Examiner* — Eric S Ruppert
(74) *Attorney, Agent, or Firm* — WORKMAN NYDEGGER

(57) ABSTRACT

A thermal battery includes a heat sink material that remains solid across an operating temperature range (i.e., for all operating modes) of the battery, and a heat conductive material in direct heat transfer relationship with the solid heat sink material. The heat conductive material has a melting point below that of the heat sink material so that in use the heat conductive material is a fluid, for example molten when the heat conductive material is a metal, in the operating temperature range of the battery.

5 Claims, 5 Drawing Sheets

PLAN

(51) Int. Cl.
 *F28D 20/00* (2006.01)
 *F28F 21/02* (2006.01)
 *F28F 21/08* (2006.01)

(52) U.S. Cl.
 CPC ......... *F28D 20/021* (2013.01); *F28D 20/025* (2013.01); *F28D 20/028* (2013.01); *F28F 21/02* (2013.01); *F28D 2020/0026* (2013.01); *F28D 2020/0047* (2013.01); *F28F 21/084* (2013.01); *F28F 21/085* (2013.01)

(56) References Cited

U.S. PATENT DOCUMENTS

| | | | |
|---|---|---|---|
| 6,272,856 B1 | 8/2001 | Foppe | |
| 8,056,341 B2* | 11/2011 | Hamer | C09K 5/00 |
| | | | 60/659 |
| 2007/0209365 A1 | 11/2007 | Hamer et al. | |
| 2008/0230203 A1* | 9/2008 | Christ | C09K 5/063 |
| | | | 165/10 |
| 2011/0289924 A1 | 12/2011 | Pietsch | |
| 2011/0308762 A1 | 12/2011 | Spero et al. | |
| 2013/0056169 A1* | 3/2013 | Stiesdal | F28D 20/021 |
| | | | 165/10 |
| 2013/0152917 A1 | 6/2013 | Couturier et al. | |

\* cited by examiner

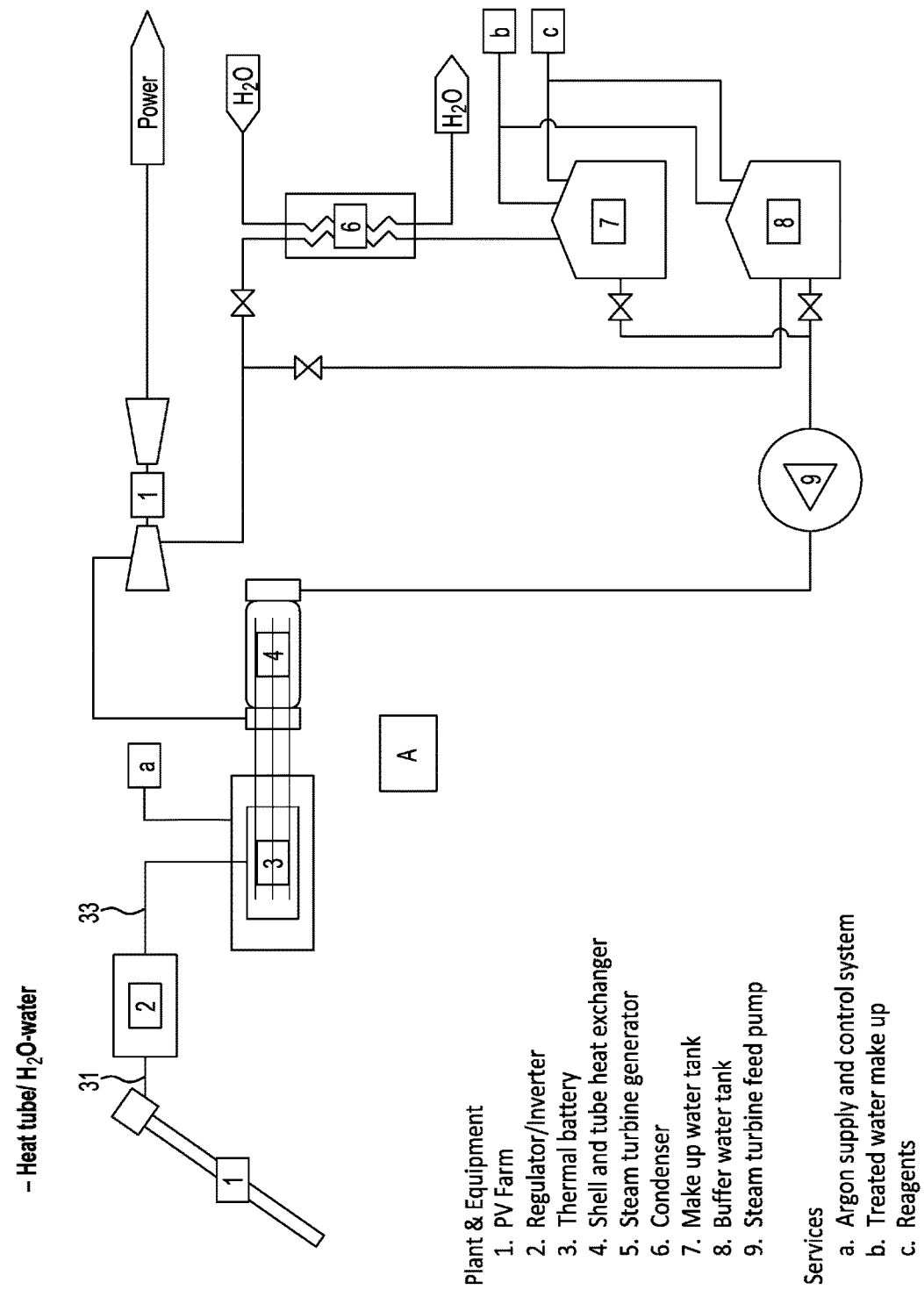

Figure 1(a): Process Flowsheet Incorporating PV farm, Thermal Battery, Steam Turbine, Generator, Condenser and Feed Water System
— Heat tube/ $H_2O$-water Plant & Equipment
1. PV Farm
2. Regulator/Inverter
3. Thermal battery
4. Shell and tube heat exchanger
5. Steam turbine generator
6. Condenser
7. Make up water tank
8. Buffer water tank
9. Steam turbine feed pump Services
a. Argon supply and control system
b. Treated water make up
c. Reagents

*Figure 1(a)*

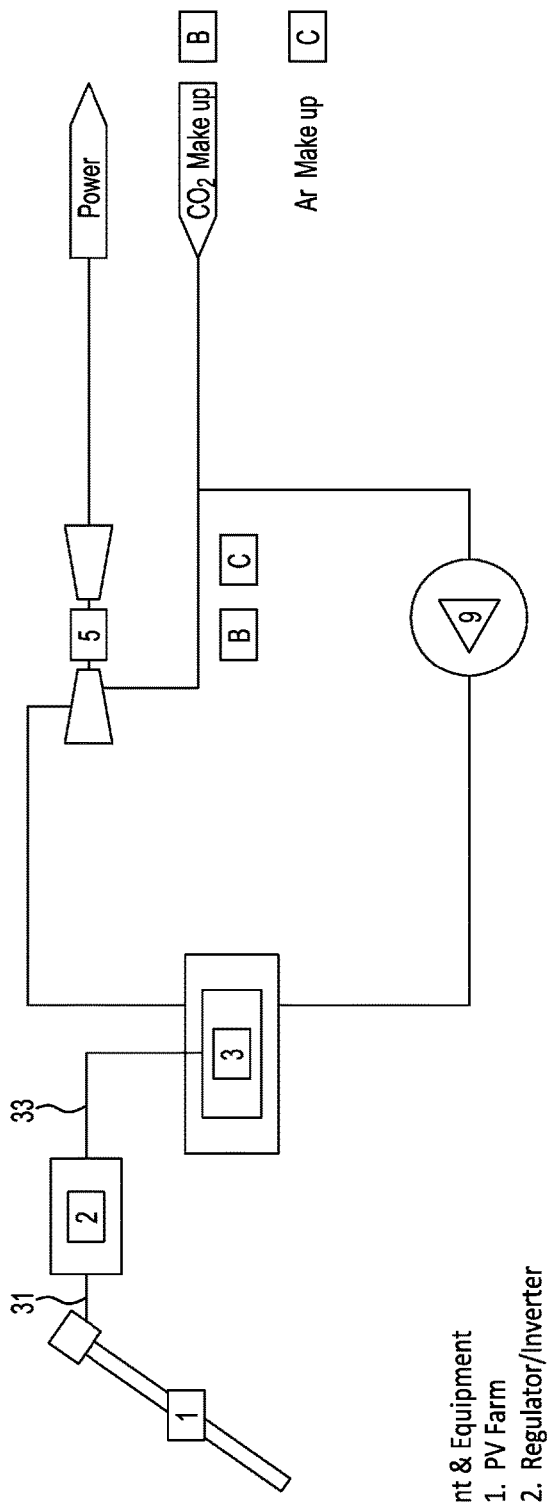

Figure 1(b): Process Flowsheet incorporating PV Farm, Thermal Battery, Steam Turbine, Generator, Condenser and Feed Water Systems
- $CO_2/CO_2$ turbine
- Ar/Ar turbine Plant & Equipment
1. PV Farm
2. Regulator/Inverter
3. Thermal battery
4. Shell and tube heat exchanger
5. $CO_2$ compressor
C. Ar compressor
9. Steam turbine feed pump Services
a. Argon supply and control system
b. Treated water make up
c. Reagents

*Figure 1(b)*

Figure 1(c): Process Flowsheet incorporating PV Farm, Thermal Battery, Steam Turbine, Generator, Condenser and Feed Water Systems - Ar/CO$_2$ - CO$_2$ turbine Plant & Equipment
1. PV Farm
2. Regulator/Inverter
3. Thermal battery
4. Shell and tube heat exchanger
5. CO$_2$ compressor
9. Steam turbine feed pump Services
a. Argon supply and control system
b. Treated water make up
c. Reagents

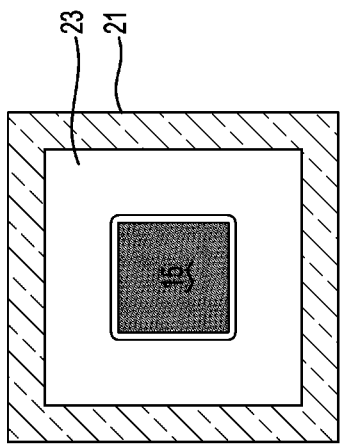
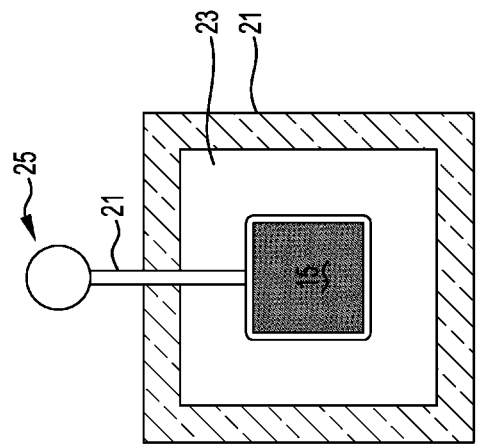
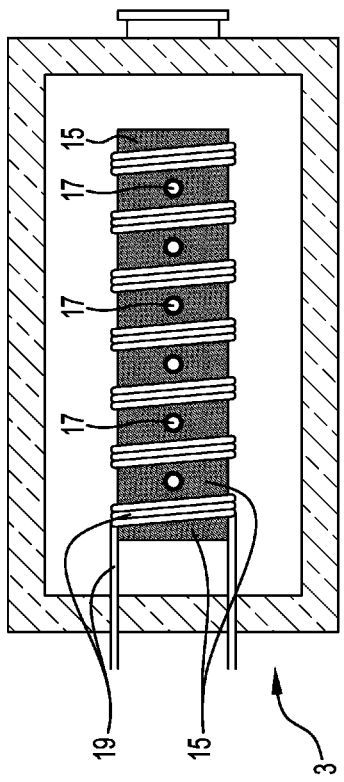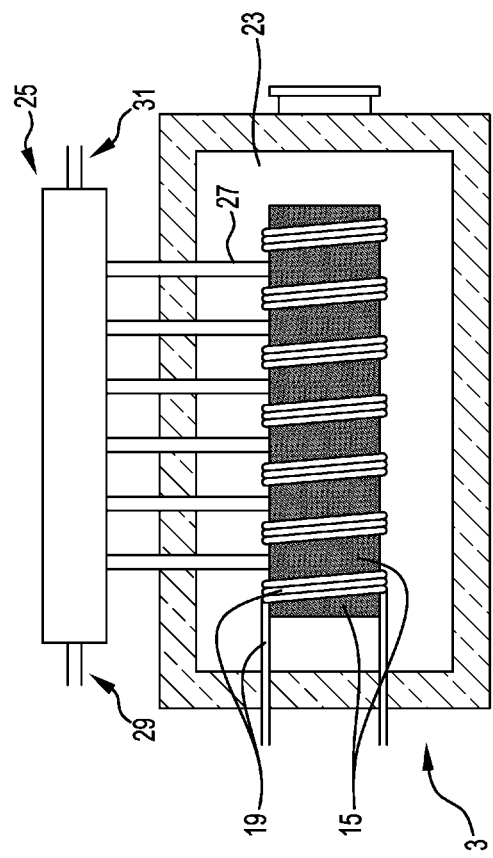

THERMAL BATTERY AND ELECTRICITY GENERATION SYSTEM

CROSS-REFERENCE TO RELATED APPLICATIONS

This application claims priority to PCT Application No. PCT/AU2018/051274, filed Nov. 29, 2018, entitled "THERMAL BATTERY AND ELECTRICITY GENERATION SYSTEM," which claims benefit of and priority to Australian Patent Application No. 2017904817, filed Nov. 29, 2017, all of which are incorporated herein by reference in their entirety.

TECHNICAL FIELD

The invention relates to a thermal battery for storing thermal energy for use for use in downstream applications, such as an electricity generation system.

The invention also relates to an electricity generation system that includes the thermal battery.

The invention also relates to a method of generating electricity that includes operating the electricity generation system.

BACKGROUND ART

The term "thermal battery" is understood herein to mean a structure that can store and release thermal energy. Thermal batteries allow energy available at one time to be temporarily stored as thermal energy and then released at another time or multiple times.

There is a considerable need for thermal batteries that are low maintenance, reliable, energy efficient and cost effective that can be utilised to store energy from intermittent sources (e.g. renewables including solar and wind) and transported to and put into service quickly at remote locations, such as mining operations.

SUMMARY OF THE DISCLOSURE

In general terms, the present invention provides a thermal battery that includes:

(a) a heat sink material that remains solid across an operating temperature range (i.e., for all operating modes) of the battery, and (b) a heat conductive material in direct heat transfer relationship with the solid heat sink material, the heat conductive material having a melting point below that of the heat sink material so that in use the heat conductive material is a fluid, for example molten when the heat conductive material is a metal, in the operating temperature range of the battery.

Typically, the term "the operating temperature range of the battery" is a function of the selection of the heat conductive material.

The operating temperature range of the thermal battery may be between 600° C. and up to 2000° C.

There is a number of possible different operating modes of the thermal o battery.

Five examples of possible operating modes are as follows:
(a) Thermal storage mode only (Charge Mode).
(b) Thermal transfer mode only (Discharge Mode).
(c) Simultaneous thermal storage and thermal transfer modes (Combined Mode).
(d) Thermal passive mode only (Passive Mode).
(e) Thermal ambient mode only (Service Mode).

These examples of operating modes are discussed below.

1. Charge Mode

The thermal battery may be configured to receive energy from a single energy source or a plurality of energy sources.

In one embodiment of the Charge Mode of the thermal battery (a) an energy source (or more than one energy sources where multiple sources are available) transfers energy to the heat conductive material and transforms the heat conductive material to a fluid or maintains the heat conductive material in a fluid state; and (b) the heat conductive material transfers thermal energy to the heat sink material and heats the heat sink material.

In another embodiment of the Charge Mode of the thermal battery, an energy source (or more than one energy sources where multiple sources are available) transfers energy to the heat sink material which converts the energy to thermal energy that is stored in the heat sink material and simultaneously transfers thermal energy to the heat conductive material and thereby transforms the heat conductive material to a fluid or maintains the heat conductive material in a fluid state.

In the abovementioned embodiments and in other embodiments of the thermal battery, the transfer of energy to the heat sink material or the heat conductive material may be direct or indirect.

A direct transfer of energy could be achieved by the use of an induction heater or a resistor bank for transferring energy from the energy source to the heat sink material.

An indirect transfer of energy could be achieved by the inclusion of an energy transfer unit for transferring energy from the energy source to the heat conductive material of the thermal battery.

For example, the energy transfer unit may be an electric arc unit with electrodes (described further below).

Operating with a heat conductive material in the fluid state in the Charge Mode provides an opportunity to maximise the efficiency of thermal transfer:

(a) from the heat conductive material to the heat sink material; and (b) from the heat sink material to the heat conductive sink material.

A decision to operate in the Charge Mode may be based on a range of factors including, by way of example, the availability of energy, the cost of energy from the energy source and the relative cost of energy sources where multiple sources are available.

For example, where the energy source provides energy in the form of electricity, the factors include the cost of the electricity from this source, and the availability and cost of other sources of electricity during the required demand period for the Charge Mode.

2. Discharge Mode

In the Discharge Mode of the thermal battery (a) the heat sink material transfers thermal energy directly to the fluid heat conductive material and (b) the fluid heat conductive material transfers thermal energy for use in a downstream application, such as an electricity generation unit.

Operating with a fluid heat conductive material in the Discharge Mode maximises thermal energy transfer from the heat sink material to the heat conductive material and makes it possible to transfer thermal energy efficiently to the heat conductive material.

3. Combined Mode

The thermal battery may be configured to receive energy from a single (any) energy source or a plurality of energy sources.

In the Combined Mode of the thermal battery both the Charge Mode and the Discharge Mode may operate:
(a) continuously, simultaneously and independently of each other; or
(b) intermittently, simultaneously and independently of each other.

In the intermittent option (b) of the Combined Mode, the operation of either the Charge Mode or the Discharge Mode may be intermittent.

A decision to turn on or continue the Charge Mode during the Discharge Mode in the intermittent option (b) will be based on a range of factors including the continuity of the availability of energy from the relevant energy source or multiple energy sources and the cost of energy from the energy source and the relative cost of energy sources where multiple sources are available.

For example, where the energy source delivers energy in the form of electricity, the factors include the cost of the electricity from this source, and the availability and cost of other sources of electricity during the required demand period for the Charge Mode within the Combined Mode.

4. Passive Mode

In the Passive Mode, the thermal battery is charged and configured such that it simply holds the energy awaiting a command to discharge.

5. Service Mode

In the Service Mode, the heat sink material does not contain any or only negligible thermal energy, and the thermal battery is transported to a specific location or locations to receive energy from a single energy source or a plurality of energy sources, i.e., to be deployed in the Charge Mode.

A decision to transport the thermal battery may be based on a range of factors including, by way of example, the availability of energy at a particular location, the cost of energy from the relevant energy source and the relative cost of energy sources where multiple sources are available.

For example, where the energy source provides energy in the form of electricity, the factors include the cost of the electricity from this source, and the availability and cost of other sources of electricity.

The energy source may be any energy source.

For example, the energy source may be any one or more of electricity generated from solar energy, wind energy, wave energy, coal, diesel and natural gas.

In one embodiment the energy source includes a plant that generates electricity from solar energy.

The heat sink material and the heat conductive material may be selected on the basis that the materials do not react chemically with each other.

The term "heat sink material" is understood herein to mean a material that can absorb heat.

In the context of the invention, as described above, the heat sink material is a material that remains in a solid state in the operating temperature range of the thermal battery.

The heat sink material may be a material that has a high heat capacity.

The heat sink material may be graphite.

In this context, the applicant has realised that the thermal battery can operate effectively with low cost forms of graphite and that it is not necessary to use more expensive crystalline forms of graphite.

The term "heat conductive material" is understood herein to mean a material that has a high thermal conductivity.

In the context of the invention, as described above, the heat conductive material is a material that has a melting point below that of the heat sink material and is a fluid within the operating temperature range of the battery.

The heat conductive material may be any suitable heat conductive material.

The heat conductive material may be any one of a metal, metal alloy and a gas.

The metal may be one of more of copper or aluminium and the gas may be any one or more of $CO_2$, $N_2$ or Ar.

The heat sink material may be in the form of a block of material.

The block of heat sink material ("heat sink block") may be immersed in the heat conductive material.

The heat sink block may be any suitable shape and size including:
(a) cylindrical shape;
(b) rectilinear shape, with straight (a) side walls, (b) end walls and (c) top and bottom walls; or
(c) a plate or combination of plates of various shapes and of any suitable lengths and widths and thicknesses.

The heat sink block may include any one or more than one of the following features:
(a) at least one void or a plurality of voids containing the heat conductive material or through which the heat sink block comes into contact with the heat conductive material;
(b) the voids may be in any suitable locations within the heat sink block;
(c) the voids may be any suitable shape and size; and
(d) the voids may be located to ensure that there is uniform heat transfer from the heat conductive material to the heat sink block or vice versa.

The voids may be bores or wells or the voids are spaces uniformly arranged in the block or plates of material.

The voids may extend from an upper surface of the block of heat sink material or the voids may be set out uniformly throughout the block of heat sink material or plates of heat sink material.

The thermal battery may include a housing that encloses the heat sink material and the heat conductive material.

The housing may be formed to thermally insulate the heat sink and the heat conductive material and thereby minimise heat loss.

The housing may be formed to be impervious to gas transfer through the housing.

The housing may contain an inert gas so that the heat sink material and the heat conductive material do not react with an atmosphere within the housing.

The thermal battery may be any suitable size.

The thermal battery may be a modular plug-and-play unit that can be transported from a manufacturing site to an end-use site and installed and operated on site quickly.

In one embodiment, the thermal battery is sized to fit into a shipping container, such as a standard shipping container.

It can be appreciated that, with this arrangement, a plurality of the thermal batteries that provide a required energy output can be transported conveniently to an end-use site and set up and operated quickly.

The thermal battery may include a control system.

The control system may be operable to control the operation of the thermal battery in the Charge Mode.

The control system may be operable to control the operation of the thermal battery in the Discharge Mode.

The control system may be operable to control the operation of the thermal battery in the Combined Mode.

The control system may be operable to control the operation of the thermal battery in the Passive Mode.

The control system may be operable to control the operation of the thermal battery in the Service Mode.

The control system may be operable to change the operation of the thermal battery from one mode to another mode.

The control system may be responsive to information relating to a range of factors including, by way of example, the availability and cost of energy from the energy source (or energy sources where multiple sources are available), the anticipated demand for electricity (including the power required and the demand time period), and the availability and cost of other sources of electricity during the required demand time period.

The control system may be responsive to operating parameters of the thermal battery, such as the operating temperature of the battery.

The control system may include sensors for monitoring directly or indirectly the temperature of the heat conductive material.

The control system may include sensors for monitoring directly or indirectly the temperature of the heat sink material.

The control system may include a controller for processing sensed temperatures and operating the energy input or the energy output from the battery in response to the sensed temperatures.

By way of example, the control system may be operable to maintain the temperature of the heat conductive material and/or the heat sink material within a required operating temperature range. For example, if the temperature reaches a maximum operating temperature, the control system may be operable to change the operation of the thermal battery such that it cannot enter Charge Mode. In addition, if the temperature reaches a minimum operating temperature, the control system may be operable to change the operation of the thermal battery to enter Charge Mode.

The present invention also provides an electricity generation system that includes:

(a) the thermal battery described above;

(b) a source of energy connected to the thermal battery for transferring energy to the heat conductive material or the heat sink material of the thermal battery;

(c) an electricity generation unit connected to the thermal battery for generating electricity from thermal energy transferred to the electricity generation unit from the thermal battery.

The system may include a plurality of the thermal batteries.

The system may include an energy transfer unit that transfers energy from the energy source to the heat conductive material.

In one embodiment, the energy transfer unit includes an electric arc unit with electrodes extending into the heat conductive material that, in use, transfers energy from the energy source to the heat conductive material.

In another, although not the only other embodiment, the energy transfer unit includes an inductive heating unit that, in use, transfers energy from the energy source to the heat sink material and the heat conductive material.

The electricity generation unit may be any suitable unit for generating electricity from thermal energy.

By way of example, the electricity generation unit may be a steam turbine generator or a gas turbine generator.

The system may include a thermal energy transfer unit for transferring thermal energy from the fluid heat conductive material to the electricity generation unit.

In one embodiment, the thermal energy transfer unit includes the fluid heat conductive material.

In another embodiment, the thermal energy transfer unit includes fluid heat conductive material and a heat pipe.

The term "heat pipe" is understood herein to mean a closed container, such as a closed pipe, in which a continuing cycle of evaporation and condensation of a fluid takes place with heat being absorbed at an evaporation end and given off at a condenser end.

In another embodiment, the thermal energy transfer unit includes a fluid heat conductive material and a super alkaline alloy metal pipe in which the pipe itself includes a complete heat exchange system (with a gas as the medium) delivering the gas to the electricity generation unit.

In another embodiment, the thermal energy transfer unit includes a fluid heat conductive material and a super alkaline alloy metal pipe in which the pipe itself includes a complete heat exchange system (with $H_2O$ as the medium) delivering steam to the electricity generation unit.

In another embodiment, the thermal energy transfer unit includes a fluid heat conductive material and a super alkaline alloy metal pipe in which the pipe itself includes a complete heat exchange process (with $CO_2$ as the medium) delivering $CO_2$ to the electricity generation unit. The $CO_2$ may be a gas. The $CO_2$ may be a supercritical liquid.

In another embodiment, the thermal energy transfer unit includes a super alkaline alloy metal pipe that runs $CO_2$ through a heat exchanger which delivers heat to a separate heat exchanger with $H_2O$ as the medium that runs a steam turbine generator that, in use, operates as the electricity generation unit.

In another embodiment, thermal energy is recovered directly from the heat sink material via the fluid heat conductive material which delivers heat to a separate heat exchanger with $H_2O$ as the medium that runs a steam turbine generator that, in use, operates as the electricity generation unit.

In another embodiment, thermal energy is recovered directly from the heat sink material via the fluid heat conductive material which runs a gas turbine generator that, in use, operates as the electricity generation unit.

The source of energy may be any suitable energy source.

In one embodiment the energy source includes a plant that generates electricity from solar energy.

The present invention also provides a method of generating electricity that includes operating the electricity generation system described above.

The method may include operating the thermal batter of the electrical generation system in a thermal storage mode (i.e. a Charge Mode) in which (a) the energy source transfers energy to the heat conductive material and transforms the heat conductive material into a fluid or maintains the heat conductive material in a fluid state and (b) the heat conductive material transfers thermal energy to the heat sink material and heats the heat sink material; and/or (c) the energy source transfers energy to the heat sink material which converts the energy to thermal energy that is stored in the heat sink material and simultaneously transfers thermal energy to the heat conductive material.

The method may include operating the thermal batter of the electrical generation system in a thermal transfer mode (i.e. a Discharge Mode) in which (a) the heat sink material transfers thermal energy to the fluid heat conductive material and (b) the fluid heat conductive material transfers energy, typically thermal energy, to the electricity generation unit.

The method may include operating the thermal batter of the electrical generation system in any one or more of the following operating modes described above:

(a) a thermal storage mode only (Charge Mode);

(b) a thermal transfer mode only (Discharge Mode);

(c) a simultaneous thermal storage and thermal transfer modes (Combined Mode);

(d) a thermal passive mode only (Passive Mode).

(e) a thermal ambient mode only (Service Mode).

BRIEF DESCRIPTION OF THE DRAWINGS

The invention is described further by way of example only with reference to the accompanying drawings of which:

FIG. 1a is a diagram of one embodiment of an electricity generation system in accordance with the invention;

FIG. 1b is a diagram of another embodiment of an electricity generation system in accordance with the invention;

FIG. 2a is a top plan view in diagrammatic form of an embodiment of a thermal battery in accordance with the invention that is suitable for use in the electricity generation systems of FIGS. 1a, b and c;

FIG. 2b is an end elevation of the thermal battery shown in FIG. 2a;

FIG. 3a is a top plan view in diagrammatic form of another embodiment of a thermal battery in accordance with the invention that is suitable for use in the electricity generation systems of FIGS. 1a, b and c;

FIG. 3b is an end elevation of the thermal battery shown in FIG. 2a;

FIG. 4b is an end elevation of the thermal battery shown in FIG. 2a;

FIG. 5b is an end elevation of the thermal battery shown in FIG. 2a.

DESCRIPTION OF EMBODIMENTS

Figure 1C:
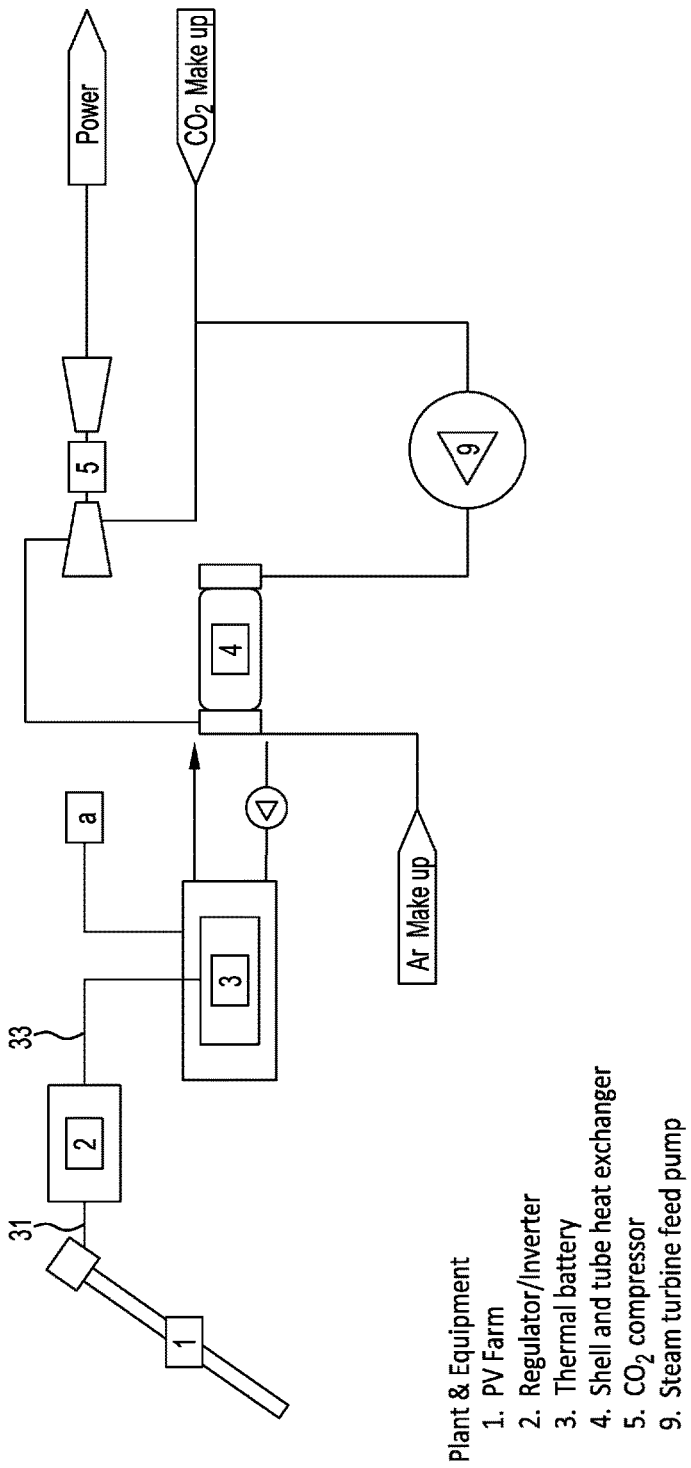
FIG. 1c is a diagram of another, although not the only other, embodiment of an electricity generation system in accordance with the invention.
Figure 5B:
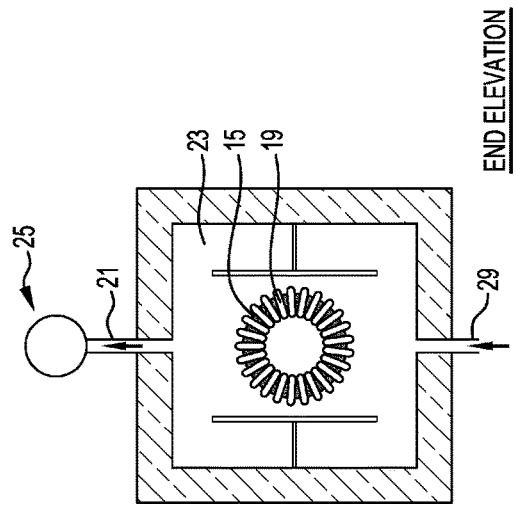

The embodiments of the electricity generation system shown in the Figures are based on a thermal battery, generally identified by the numeral 3 in the Figures.

The embodiment of the thermal battery 3 shown in FIG. 2a, b includes:

(a) a block of graphite 15 that acts as a heat sink material that, in use of the thermal battery 3, remains as a solid across an operating temperature range of the battery;

(b) a plurality of voids 17 formed in the graphite block 15;

(c) an induction coil 19 wrapped around the graphite block 15 and connected to an external energy source 1 of FIGS. 1a, b and c for providing energy to the thermal battery 3; and (d) heat conductive material in the voids 17 to transfer (i) energy from the external energy source 1 to the graphite in a heat storage mode (i.e.

the above-described Charge Mode) of the battery 3 and (ii) thermal energy from the graphite to an electricity generation unit generally identified by the numeral 5 of FIGS. 1a, b and c in a heat transfer mode of the battery.

In the embodiment of the thermal battery 3 shown in FIGS. 2a, b, the heat conductive material is a metal, i.e. aluminium in this instance, that is in heat transfer relationship with the graphite block 15 and has a melting point below that of the graphite so that in use the aluminium is molten in the operating temperature range of the battery 3.

With further reference to FIGS. 2a, b, the voids 17 are cylindrical-shaped and extend into the graphite block 15 from an upper surface of the block. The voids 17 are evenly-spaced within the graphite block 15 so that, in use, there is uniform heating of the graphite via the heat conductive material.

It is noted that the invention is not confined to cylindrical-shaped voids and the described array of the voids.

The aluminium is in heat transfer relationship with the graphite block 15. The aluminium has a melting point below that of the graphite. In use, the operating temperature range of the battery, typically 600° C.-2000° C., is selected so that the aluminium melts and forms a molten metal within the operating temperature range of the battery 3. Operating with fluid aluminium facilitates efficient energy transfer in the thermal battery 3.

The thermal battery 3 shown in FIGS. 2a, b also includes a refractory lined housing 21 that encloses the graphite block 15 and the aluminium and thermally insulates the graphite block 15 and the aluminium. It is noted that the housing 21 does not have to be a pressure vessel.

With further reference to FIG. 2a, b, in use, argon or any other suitable inert gas is supplied to the volume 23 in the housing 21 via an argon source (not shown) to maintain an inert atmosphere within the housing 21 to prevent reactions occurring between the materials in the housing.

The graphite block 15 and the voids 17 may be any suitable shape and size.

The size and shape of the graphite block 15 and the voids 17 may be selected to allow the thermal battery 3 to be fitted into a standard shipping container and be set-up as a plug-and-play unit that can readily be transported to an end-use location such as remote mining operations. Depending on the energy requirements, there may be a plurality of these modular thermal batteries on side and arranged to operate together as part of the electricity generation system.

The thermal battery 3 also includes a control system (not shown) that is operable to control the operation of the thermal battery 3 in the thermal storage mode (i.e. the above-described Charge Mode), the thermal transfer mode (i.e. the above-described Discharge Mode), and a stand-by mode (i.e. the above-described Passive Mode) in which there is no heat transfer to and no thermal transfer from the thermal battery.

The control system is also operable to change the operation of the thermal battery from one mode to another mode.

The control system is responsive to information relating to a range of factors including, by way of example, the availability and cost of energy from the energy source (or energy sources where multiple sources are available), the anticipated demand for electricity (including the power required and the demand time period), and the availability and cost of other sources of electricity during the required demand time period.

The control system is responsive to operating parameters of the thermal battery, such as the operating temperature of the battery, and includes sensors (not shown) that monitor directly or indirectly the temperature of the heat conductive material and/or the heat sink material.

The control system may include a controller for processing sensed temperatures and operating the energy input or the energy output from the thermal battery 3 in response to the sensed temperatures. For example, if the temperature reaches a maximum operating temperature, the control system changes the operation of the thermal battery 3 to the Passive mode described above. If the temperature reaches a minimum operating temperature, the control system changes the operation of the thermal battery to the heat storage mode.

The control system moves the operation of the thermal battery 3 between the modes as required.

The embodiment of the thermal battery 3 shown in FIGS. 3a, b is conceptually the same as the FIGS. 2a, b embodiment and the same reference numerals are used to describe the same features.

One main difference between the embodiments is that in the embodiment of FIG. 3a, b the heat conductive material is a gas, such as $CO_2$, $N_2$ or Ar, rather than aluminium or another metal. The gas is contained within a volume 23 within the housing 21 that is not occupied by the graphite block 15. The gas is supplied to and removed from the volume 23 via a heat exchanger assembly generally identified by the numeral 25 having inlet/outlet tubes 27 communicating with the volume 23, a cold gas inlet tube 29 communicating with a source of cold gas (not shown), and a hot gas outlet tube 31 communicating with an electrical generation system 5 of FIGS. 1a, b, c.

The use of gas as the heat conductive material means that it is not absolutely necessary to form voids 17 in the graphite block 15. Having said this, the voids 17 may be provided to improves the surface are for heat transfer.

In use of the embodiment shown in FIGS. 3a, b, the induction heating coil 19 heats the graphite in the graphite block, and there is heat transfer from the graphite to the gas in the volume 23 during a Charge Mode. In addition, in use, the heated gas is discharged from the volume 23 during a Discharge Mode.

Figure 4B:
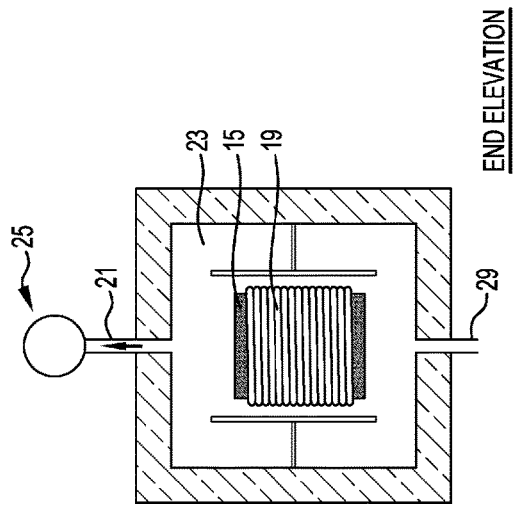
Figure 4A:
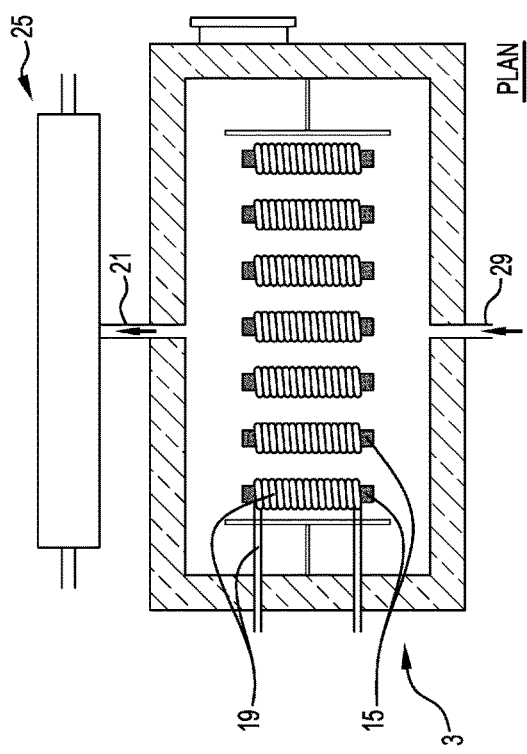
FIG. 4a is a top plan view in diagrammatic form of another embodiment of a thermal battery in accordance with the invention that is suitable for use in the electricity generation systems of FIGS. 1a, b and c.

The embodiments of the thermal battery 3 shown in FIGS. 4a, b and 5a, b are conceptually the same as the FIG. 3a, b embodiment and the same reference numerals are used to describe the same features.

The main difference between the embodiments is the form of the heat sink material. Instead of the single graphite block 15 shown in FIGS. 3a, b, in the embodiments of FIGS. 4a, b and 5a, b, there is a plurality of smaller, spaced-apart graphite blocks 15. In particular, the graphite blocks in FIGS. 5a, b are donut-shaped. These arrangements provide higher surface areas of contact between the graphite and the gas for improved heat transfer.

Figure 5A:
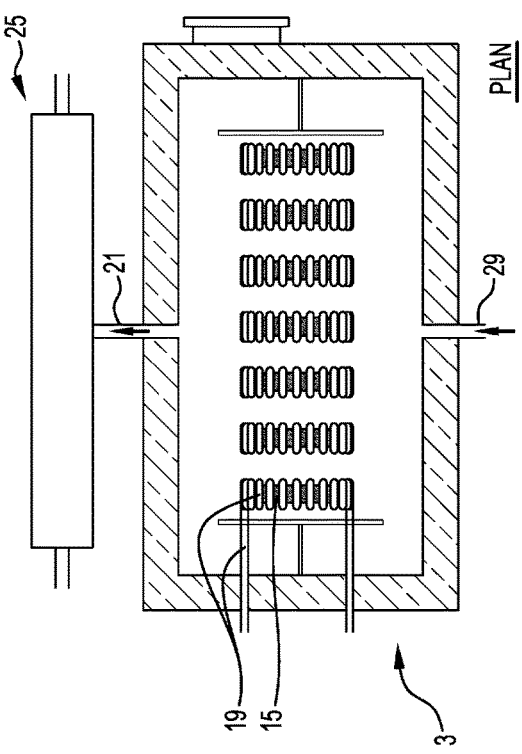
FIG. 5a is a top plan view in diagrammatic form of another, although not the only other, embodiment of a thermal battery in accordance with the invention that is suitable for use in the electricity generation systems of FIGS. 1a, 1b, and 1c.

In addition, the embodiments of FIGS. 4a, b and FIGS. 5a, b are continuous flow through arrangements with the housing 21 having an opening for cold gas directly from the gas inlet pipe 29 and an outlet for hot gas for the hot gas tube 21.

The operation of the embodiments of the thermal battery 3 shown in FIGS. 2-5 as part of the electricity generation system shown in FIGS. 1a, b and c is as follows:

(a) in a Charge Mode of the thermal battery, energy from the energy source heats the graphite block(s) 15 and the graphite absorbs energy and stores it as heat;

(b) in a thermal energy transfer mode, i.e. Discharge Mode, of the thermal battery 3, heat is subsequently recovered from the block(s) 15 and is transferred to the electricity generation unit; and (c) energy transfer to and from the block(s) 15 is via the conductive material in the fluid state.

It is noted that the thermal battery 3 of the embodiments of FIGS. 2-5 may operate simultaneously in the Charge mode and the Discharge mode.

The embodiments of the electrical generation system shown in FIGS. 1a, b and c may include any one or more of the thermal batteries 3 of FIGS. 2-5.

With reference to these Figures, the energy source is solar energy 1 that, by way of example only is collected via a plurality of mirrors that reflect solar energy onto a target surface of a receiver, with the target surface comprising a plurality of photovoltaic cells, with the cells producing electricity.

The direct current electricity from the energy source 1 is transferred to a regulator/inverter 2 that ensures appropriate regulation of supply and generation of 3 phase power.

The 3-phase power from the regulator/inverter 2 is transferred to the heat conductive material (in the case of aluminium via an energy transfer unit in the form of an electric arc unit with electrodes extending into the aluminium when the thermal battery is operating in the Charge Mode.

The electric arc unit is not shown specifically in the Figures but is illustrated diagrammatically by the lead line 31 connecting together the energy source 1 and the regulator/inverter 2 and the lead line 33 connecting together the regulator/inverter 2 and the thermal battery 3.

The inductive heating unit as shown in FIGS. 2-5 is another option for heat transfer from the energy source to the thermal battery.

Heat pipes are used to transfer heat from the graphite block(s) 15 of the thermal battery 3 via the heat conductive material of the battery 3 to an electricity generation unit when the thermal battery 3 is operating in the thermal transfer mode, i.e. the Charge Mode.

The heat pipes are in heat transfer relationship with the heat conductive material fluid and, in use, evaporate a fluid in the heat tubes and absorb thermal energy as a consequence.

The resultant gas phase moves toward the cooler opposite ends of the heat pipes.

The electricity generation unit includes a heat exchanger 4 in FIGS. 1a, b and c that is in heat transfer relationship with the heat pipes at the cooler ends of the pipes. The gas phase in the heat pipes transfers heat to water flowing through the heat exchanger and generates steam.

The steam generated in the heat exchanger 4 is transferred to and drives a steam turbine generator 5 of FIGS. 1a, b and c and generates electricity.

The electricity from the steam turbine generator is transferred to end-use applications to meet power demands.

The spent steam and condensate from the steam turbine generator are collected, cooled as required, and recirculated to the heat exchanger 4.

The water used in the steam circuit is treated as required to mitigate corrosion.

The system includes monitoring and control systems to operate the system.

More particularly, the spent steam and condensate are transferred to a condenser 6 of FIGS. 1a, 1b, and 1c and condensed and cooled. Water from the condenser and make-up water from a storage tank 7 of FIGS. 1a, 1b, and 1c, and water conditioners from a water buffer tank 8 of FIGS. 1a, 1b, and 1c are transferred to the heat exchanger.

A pump 9 of FIGS. 1a, 1b, and 1c pumps water through this circuit.

The above-described thermal battery 3, in the various configurations, is a low maintenance, reliable, energy efficient and cost-effective unit that can be transported to and put into service quickly at remote locations, such as mining operations. The thermal battery is a straightforward structure. The use of a heat conductive material, that is fluid within the operating temperature range of the battery facilitates efficient heat transfer between the heat conductive material (e.g., metal or metal alloy or gas) and the heat sink material (e.g., graphite).

Many modifications may be made to the embodiment of the invention described herein without departing from the spirit and scope of the invention.

By way of example, whilst the embodiment includes graphite as the heat sink material, the invention is not so limited and extends to any suitable material with high heat capacity that remains as a solid material in the operating temperature range of the thermal battery.

By way of example, whilst the embodiment includes aluminium and $CO_2$, $N_2$ or Ar as examples of the heat conductive material, the invention is not so limited and extends to any suitable material with high thermal conductivity and a melting point below that of the heat sink material so that in use the heat conductive material is fluid in the operating temperature range of the battery.

The invention claimed is:

1. A thermal battery includes:
   (a) a heat sink material that remains solid across an operating temperature range of the thermal battery, wherein the heat sink material includes graphite,
   (b) an induction coil for providing energy to the thermal battery,
   (c) a heat conductive material in the form of a gas in heat transfer relationship with the heat sink material to receive thermal energy from the heat sink material to maintain the gas in a gas state and to transfer thermal energy for use in a downstream application, the heat conductive material being a metal and having a melting point below that of the heat sink material so that in use the heat conductive material is fluid in the operating temperature range of the battery; and
   (d) a housing that encloses the heat sink material and the heat conductive material and is formed to thermally insulate the heat sink and the heat conductive material and thereby minimise heat loss via the housing;
   (e) a control system that is operable to control the operation of the thermal battery in a thermal storage mode, a thermal transfer mode, and in a standby mode in which there is not heat transfer to and no thermal transfer from the thermal battery; and
   wherein:
   the heat sink material and the heat conductive material are selected on the basis that the materials do not react chemically with each other, and
   the heat sink material is in the form of a block of material that is immersed in the heat conductive material;
   the block of material includes a void or a plurality of voids that contain the heat conductive material,
   the induction coil is wrapped around the block of material, and
   the thermal battery is a modular plug-and-play unit that can be transported from a manufacturing site to an end-use site and installed and operated on site and that provides an energy output such that a plurality of modular thermal batteries can be configured to operate as part of an electricity generation system to provide a required energy output for a particular application.

2. The thermal battery defined in claim 1 wherein, the operating temperature range of the battery is between 600° C. and up to 2000° C.

3. The thermal battery defined in claim 1 wherein the control system is operable to change the operation of the thermal battery from one mode to another mode.

4. The thermal battery defined in claim 1 wherein the control system is responsive to information relating to a range of factors including an availability and cost of energy from the energy, an anticipated demand for electricity, and an availability and cost of other sources of electricity during the required demand time period.

5. The thermal battery defined in claim 4 wherein the control system includes sensors for monitoring directly or indirectly the temperature of the heat conductive material and/or the heat sink material and the control system includes a controller for processing sensed temperatures and operating an energy input or the energy output from the battery in response to the sensed temperatures.

* * * * *